US012613793B2

(12) United States Patent
Lee et al.

(10) Patent No.: US 12,613,793 B2
(45) Date of Patent: Apr. 28, 2026

(54) EMBEDDED DEVICE TESTING METHOD USING HOST VIRTUALIZATION AND COMPUTING DEVICE EXECUTING THE SAME

(71) Applicant: AIWORKX Inc., Hwaseong-si (KR)

(72) Inventors: Jin Suk Lee, Seoul (KR); Jung Hyun Im, Hanam-si (KR); Seung Won Lee, Seoul (KR); Yeon Jae Lee, Seoul (KR); Woo Joo Kim, Seoul (KR); Suk Won Yoon, Seoul (KR)

(73) Assignee: AIWORKX Inc., Hwaseong-si (KR)

( * ) Notice: Subject to any disclaimer, the term of this patent is extended or adjusted under 35 U.S.C. 154(b) by 285 days.

(21) Appl. No.: 18/518,536

(22) Filed: Nov. 23, 2023

(65) Prior Publication Data

US 2025/0086097 A1     Mar. 13, 2025

(30) Foreign Application Priority Data

Sep. 12, 2023     (KR) ........................ 10-2023-0121240

(51) Int. Cl.
*G06F 11/3668*          (2025.01)
(52) U.S. Cl.
CPC ........ *G06F 11/3688* (2013.01); *G06F 11/368* (2013.01); *G06F 11/3692* (2013.01)
(58) Field of Classification Search
None
See application file for complete search history.

(56) References Cited

U.S. PATENT DOCUMENTS 9,805,528 B1     10/2017  Toepke et al.
10,678,666 B1     6/2020  Gauf et al.
(Continued)

FOREIGN PATENT DOCUMENTS

JP          2018-14098 A      1/2018
KR     10-2009-0030363 A      3/2009
(Continued)

OTHER PUBLICATIONS

Office Action dated Nov. 30, 2023, issued in counterpart KR application No. 10-2023-0121240, with English translation. (11 pages).

(Continued)

*Primary Examiner* — Philip Wang
*Assistant Examiner* — Rongfa P Wang
(74) *Attorney, Agent, or Firm* — WHDA, LLP

(57) ABSTRACT

The present invention relates to an embedded device testing method. Preferably, the present invention relates to a function testing method for an embedded device designed to execute a specific function. The embedded device testing method having a hierarchical host structure executed on a computing device according to the present invention includes: receiving, by a main host, setting information for an execution environment of a target device; constructing a virtualized execution environment on a sub host according to the setting information; executing specific software or a specific test case in the constructed execution environment; and monitoring a result of the execution. According to the present invention, resources may be utilized efficiently because there is no need to newly configure and prepare physical hardware resources every time during the development and testing of an embedded device.

10 Claims, 7 Drawing Sheets

(56) References Cited

U.S. PATENT DOCUMENTS

| | | | | |
|---|---|---|---|---|
| 11,954,238 | B1 * | 4/2024 | Tan ....................... | H04L 9/0891 |
| 2010/0146487 | A1 | 6/2010 | Chun et al. | |
| 2015/0363296 | A1 | 12/2015 | Lee et al. | |
| 2018/0089068 | A1 * | 3/2018 | Bhojan ..................... | G06F 8/61 |
| 2019/0303185 | A1 * | 10/2019 | Paithankar ................ | G06F 8/65 |
| 2020/0301791 | A1 * | 9/2020 | Zhang .................... | G06F 9/455 |
| 2022/0198054 | A1 * | 6/2022 | Picos ....................... | G06N 5/04 |
| 2023/0350791 | A1 * | 11/2023 | Kadirvel ............. | G06F 11/3688 |

FOREIGN PATENT DOCUMENTS

| | | | | |
|---|---|---|---|---|
| KR | 10-2014-0072726 | A | 6/2014 | |
| KR | 101517893 | B1 | 5/2015 | |
| KR | 10-2020-0048633 | A | 5/2020 | |
| WO | WO-2019100690 | A1 * | 5/2019 | .......... G06F 11/3688 |

OTHER PUBLICATIONS

Extended European Search Report dated May 31, 2024, issued in counterpart European application No. 23212938.7. (8 pages).

* cited by examiner

Start

Determine, by main host, schedule of test request of user    ~S10

Allocate sub host when embedded device of user and execution environment become available according to schedule    ~S20

End

Start

Store, by main host, test case and revision history of test case    ~S30

Reuse pre-constructed execution environment according to history of setting information    ~S40

End

300

EMBEDDED DEVICE TESTING METHOD USING HOST VIRTUALIZATION AND COMPUTING DEVICE EXECUTING THE SAME

CROSS-REFERENCE TO RELATED APPLICATION(S)

This application claims benefit of priority to Korean Patent Application No. 10-2023-0121240 filed on Sep. 12, 2023 in the Korean Intellectual Property Office, the disclosure of which is incorporated herein by reference in its entirety.

BACKGROUND

1. Field

The present invention relates to an embedded device testing method. Preferably, the present invention relates to a function testing method for an embedded device designed to execute a specific function.

2. Description of Related Art

Hitherto, an embedded device has been tested in a manner in which all hardware environments related to the embedded device to be tested are established in each host device, and then software is downloaded to the embedded device to thereby perform the test.

Here, a plurality of same embedded devices may be tested at the same time in the same environment by connecting the plurality of embedded devices to one host and testing the embedded devices at the same time.

A user needs to be equipped with corresponding testing equipment and perform the test while changing a corresponding hardware configuration and software according to an environment desired by the user.

Therefore, in a case where multiple users share single hardware equipment to perform the test, it is necessary to repetitively reconfigure a desired environment each time to perform the test, which is inefficient.

In addition, high production costs are required in the early stages of development in order to distribute corresponding test equipment to all users, and frequent hardware changes also cause high costs.

SUMMARY

An object of the present invention is to propose an environment in which software may be selected for an expected environment and a corresponding environment with a virtualized condition and the corresponding software may be tested under all preset environments or conditions.

Another object of the present invention is to propose a method for configuring hardware according to an environment and combination for testing in various environments during a software development process, and configuring an environment in which software may be installed.

Another object of the present invention is to propose a method for efficiently testing a limited number of embedded devices that have high development costs in the early stages of development or are continuously improved.

According to an exemplary embodiment of the present invention, an embedded device testing method having a hierarchical host structure executed on a computing device includes: receiving, by a main host, setting information for an execution environment of a target device; constructing a virtualized execution environment on a sub host according to the setting information; executing specific software or a specific test case in the constructed execution environment; and monitoring a result of the execution.

The embedded device testing method may further include storing the constructed execution environment, in which in the constructing of the virtualized execution environment on the sub host, a pre-constructed execution environment may be reused according to a history of the setting information.

The embedded device testing method may further include: determining, by the main host, a schedule of a test request of a user; and allocating the sub host when the target device of the user and the execution environment become available according to the determined schedule, in which in the constructing of the virtualized execution environment on the sub host, the execution environment may be constructed on the allocated sub host.

The embedded device testing method may further include storing, by the main host, the test case and a revision history of the test case.

The embedded device testing method may further include authenticating, by the main host, a user, in which in the receiving of the setting information for the execution environment, the setting information corresponding to an access right of the authenticated user may be received.

DETAILED DESCRIPTION

The following description exemplifies only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

The objects, features, and advantages described above will become more obvious from following detailed description provided in relation to the accompanying drawings.

Therefore, those skilled in the art to which the present invention pertains may easily practice the technical spirit of the present invention.

Further, in describing the present invention, in the case in which it is determined that a detailed description of the well-known technology related to the present invention may unnecessarily make the gist of the present invention unclear, it will be omitted. Hereinafter, exemplary embodiments of the present invention will be described in detail with reference to the accompanying drawings.

Figure 1:
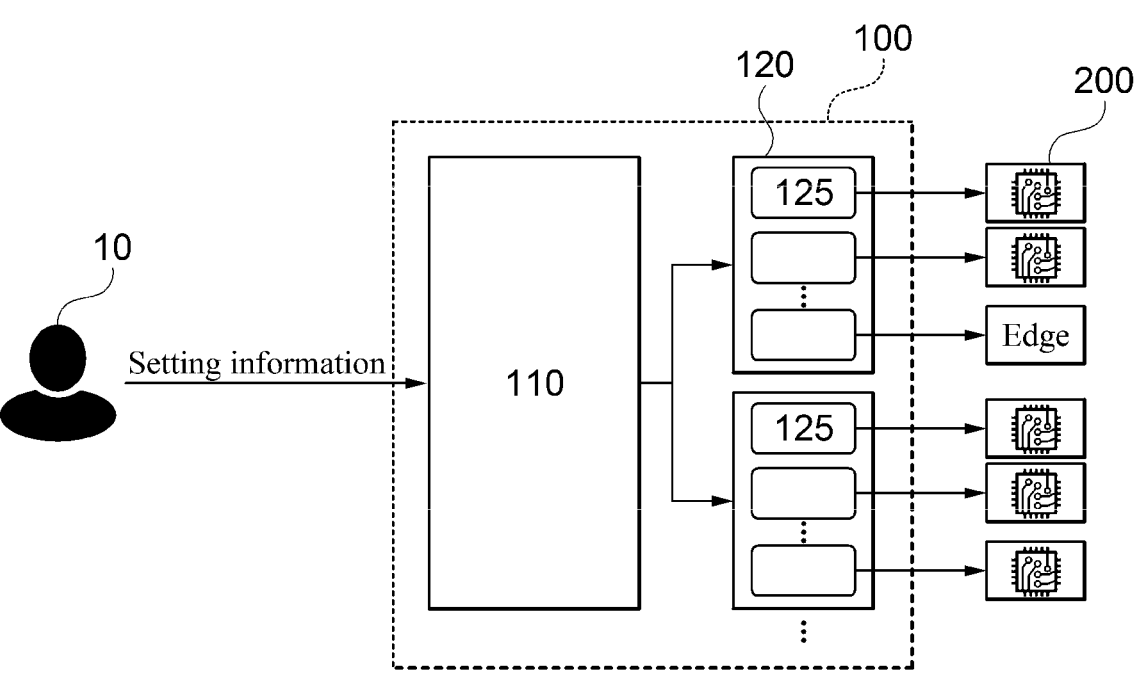
FIG. 1 is a diagram conceptually illustrating a configuration of a testing system for a computing device according to an exemplary embodiment of the present invention.

FIG. 1 is a diagram illustrating a testing system having a hierarchical host structure according to the present invention.

Referring to FIG. 1, the system according to the present exemplary embodiment may include a user 10 who inputs setting information for testing, a testing device 100 that constructs an environment according to the setting information of the user 10 and performs a test, and a target device 200 to be tested.

The user 10 may input test setting information by using an interface provided by the testing device 100.

At this time, the user 10 may remotely access the testing device 100 and input the setting information. In addition, the user 10 may be a plurality of user groups, each user 10 may remotely access the testing device 100 and input the setting information for the target device 200 to be tested, and the testing device 100 may manage test schedules of the users 10.

The testing device 100 may have a hierarchical structure including a main host 110 and a sub host 120.

The main host 110 may manage all connected devices, environments, the user 10, and a test case (TC). The sub host 120 performs an actual test in which each embedded target device 200 is connected.

When the user 10 selects the target device 200 to be tested and an environment on the main host 110, the corresponding environment may be virtualized and set on the sub host 120, and pieces of software may be installed.

An installed virtual environment 1250 may be connected to the target device 200 to be tested, and thus, a device and environment desired by the user 10 may be variably constructed, and software or a TC selected by the user 10 is executed.

The sub host 120 sets various hardware or software environments in a virtualized execution environment and then installs the environments as needed to variably perform the test in various environments.

In the present exemplary embodiment, the main host 110 and the sub host 120 may be physically separated, and thus, the testing device 100 may be configured by logical combination with various sub hosts 120 when addition of the target device 200 is performed later.

Hereinafter, a specific testing method will be described with reference to FIG. 2.

Figure 2:
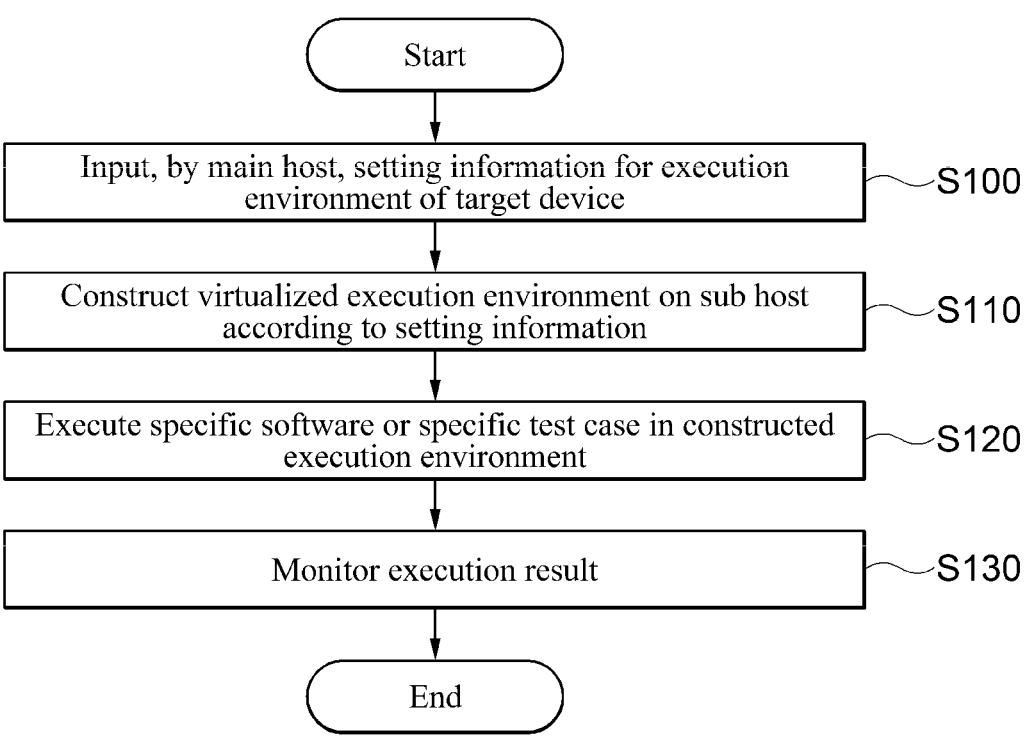
FIG. 2 is a flowchart illustrating a process of an embedded device testing method according to an exemplary embodiment of the present invention.

FIG. 2 is a flowchart illustrating the testing method according to an exemplary embodiment of the present invention.

The main host 110 may receive setting information for an execution environment of the target device 200 (S100).

The setting information may be input by the user 10 through the interface provided by the testing device 100.

The main host 110 provides various testing environments to the user 10. Here, the user 10 may select a device to be tested, software to be executed, and an environment in which the device and the software are to be operated.

The user 10 may select a desired setting through a graphical user interface (GUI) or a text-based user interface command line interface (CLI).

Figure 3:
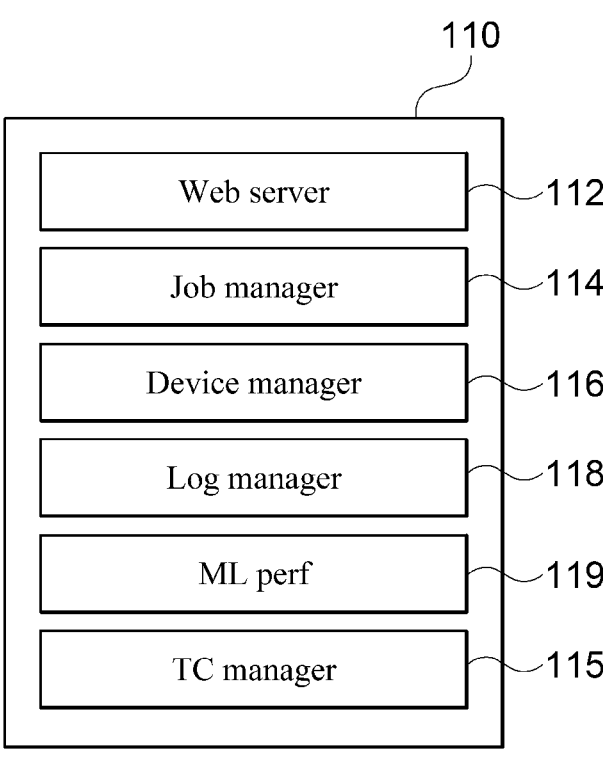
FIG. 3 is a diagram illustrating a configuration of a main host of the computing device for testing according to an exemplary embodiment of the present invention.

FIG. 3 illustrates a configuration of the main host 110 according to an exemplary embodiment of the present invention.

The main host 110 for testing the target device 200 according to the present exemplary embodiment may have various configurations.

For example, a web server 112 may provide a web-based interface that allows the user 10 to easily set and manage the testing environment, and the user 10 may remotely access the interface and request testing.

In addition, the web server 112 may request external information or provide a processing result to a device of the user 10 by providing an application programming interface (API) endpoint in such a way that an external system or service may interact with a host system.

Further, the web server 112 may support transmission of data using an HTTP/HTTPS protocol between a client of the user and the main host 110, the user 10 may transmit data to the main host 110, and the main host 110 may perform the test by referring to the data.

A job manager 114 may manage when and on what device the test is to be performed, and may dynamically allocate a computing resource and device required for the test.

In addition, the job manager 114 may also determine which of several test tasks needs to be executed first.

Figure 4:
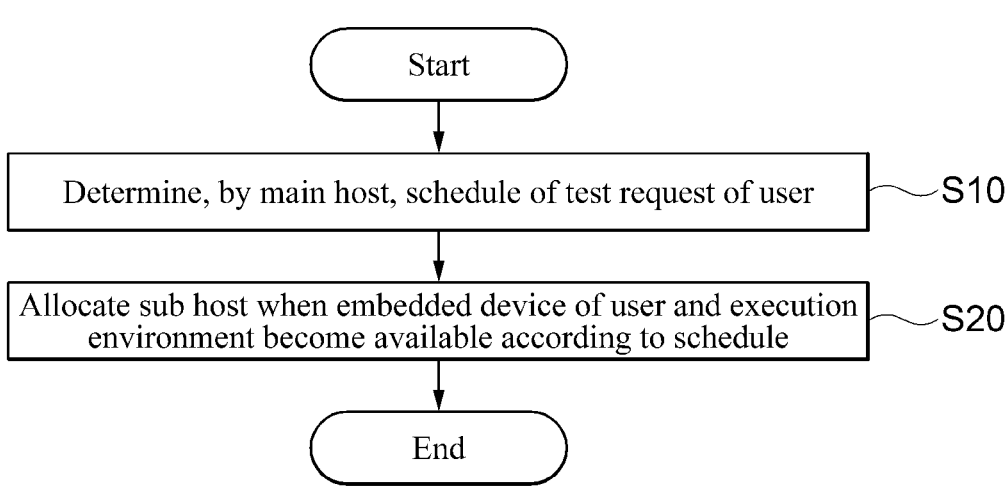
FIGS. 4 and 5 are flowcharts illustrating a detailed process of the embedded device testing method according to an exemplary embodiment of the present invention.

Specifically, referring to FIG. 4, the main host 110 may determine a schedule for a test request of the user 10 (S10).

Next, the main host 110 may allocate the sub host 120 when the target device 200 of the user 10 and the execution environment become available according to the determined schedule (S20).

A device manager 116 may manage the target devices 200 to be tested and monitor the current device status in real time. Further, the device manager 116 may also select an appropriate device to be tested and allocate resources according to the job manager 114.

A log manager 118 may collect a log generated from device testing and a request or feedback from the user 10, and may store log data for problem diagnosis or performance monitoring.

Figure 5:
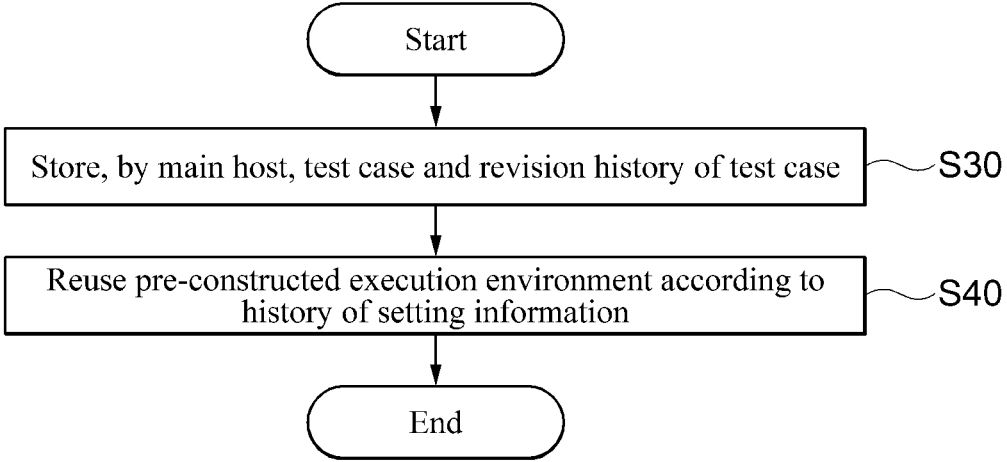

Referring to FIG. 5, in the present exemplary embodiment, the main host 110 may store the test case and a revision history of the test case (S30). The test case may be reused based on the stored history, or a performance history of the target device 200 may be confirmed through the history (S40).

Next, the main host 110 may allow a pre-constructed execution environment to be reused according to a history of the setting information.

Furthermore, a machine learning performance (ML Perf) 119 may measure a performance of a machine learning model in a case where the target device 200 includes machine learning, and analyze performance data to find an optimization point or use the analyzed performance data for control of hyperparameters using automated machine learning (AutoML) later. In addition, the ML Perf 119 may generate and provide a report by summarizing AutoML-based performance measurement results.

A test case manager (TC manager) 115 may manage a list and properties of test cases to be used for testing, and track and analyze execution results of the respective test cases in units of tests. In addition, the TC manager 115 tracks a change history of the test case and manage the change history by version.

The TC manager 115 may analyze and learn accumulated normal/abnormal logs and results based on artificial intelligence (AI), so that the accumulated normal/abnormal logs and results may be utilized to identify an abnormal state and a cause of the abnormal state during operation based on logs generated during execution in future.

That is, the above configurations may be linked to each other within the main host 110 to help efficiently test the target device 200 even in a complex testing environment.

Next, the testing device 100 may construct a virtualized execution environment on the sub host 120 according to the setting information (S200).

In the present exemplary embodiment, the system may automatically set the environment selected by the user 10 as a Docker container or a virtual machine (VM) on the sub host 120, and necessary software and libraries in the virtual environment may be installed.

In the present exemplary embodiment, the system may determine a virtual environment based on a VM 109 using a hypervisor 103 and a guest operating system (OS) 107 or a virtual environment based on a Docker container 104 on an OS 105 for testing the target device 200 according to a specific purpose and situation.

Figure 6:
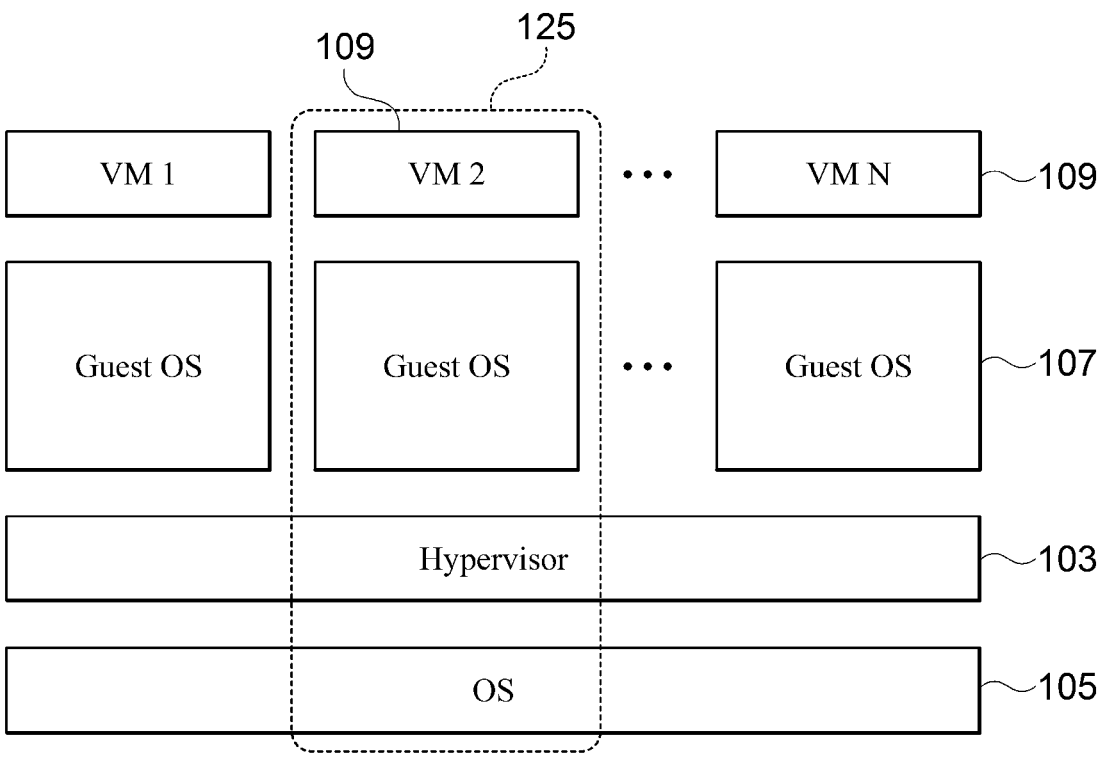
FIGS. 6 to 8 are diagrams illustrating a configuration of a sub host of the computing device for testing according to an exemplary embodiment of the present invention.

First, referring to FIG. 6, the system according to the present exemplary embodiment may configure a VM-based virtual environment 125.

The hypervisor 103 may emulate hardware to allow execution of multiple independent virtual machines.

The guest OS 107 may be an operating system that runs on a virtual machine and include the entire operating system, which allows a high level of isolation and complex applications to be executed.

For example, the VM-based virtual environment may be configured in a case where a content of the test case requires a high level of isolation, and testing in various OS environments is required.

Further, in a case where testing of complex network topologies and interactions is required, an environment may be implemented on the sub host by using a virtual machine.

On the other hand, since a virtual machine has a high resource usage, long start/end times, and high overhead, the main host 110 according to the present exemplary embodiment may determine whether or not to configure the VM-based virtual environment by referring to the schedule of the job manager 114.

Figure 7:
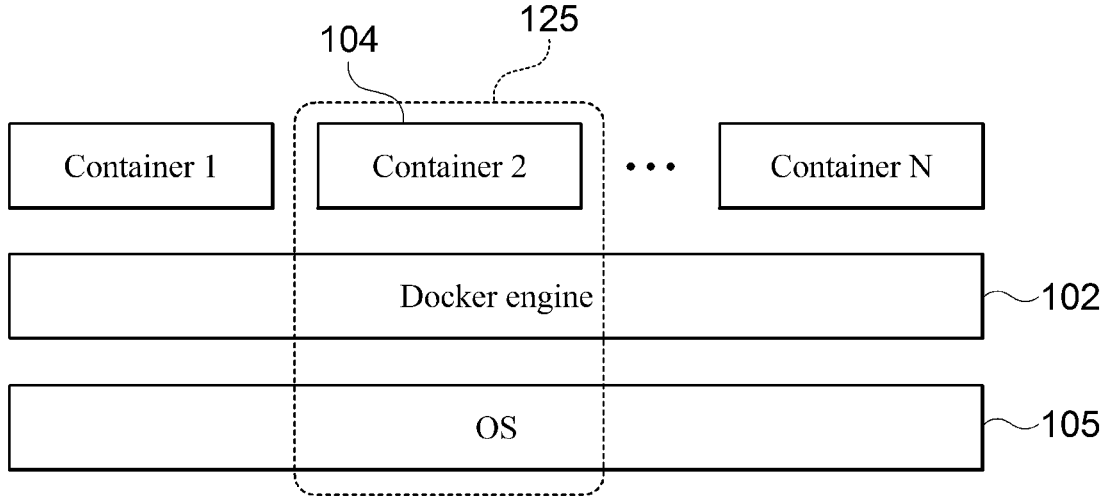
Figure 8:
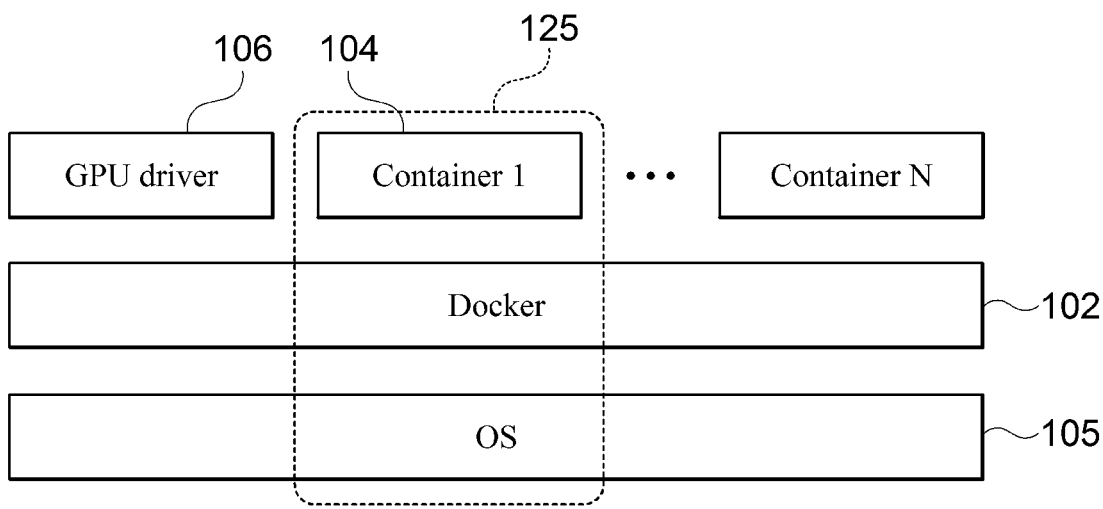

In addition, referring to FIG. 7, the system may also execute the test case through a Docker-based virtual environment 125.

A Docker engine 102 may execute and manage a containerized application.

A container 104 may configure a package of an application, necessary libraries thereof, settings, and the like as an execution unit to ensure rapid distribution and high scalability.

Further, the system according to the present exemplary embodiment may maintain the environment from development to distribution through Docker in a case of tests that require environmental consistency to be maintained.

However, the level of isolation at the OS level may be lower than that of the virtual machine, and because the Linux kernel is shared, there may be a limitation in testing in various OS environments.

That is, the system according to the present exemplary embodiment may configure a VM-based testing environment in a case of performing a test that requires a high level of isolation and various OS environments, and may configure a Docker-based testing environment in a case where fast and efficient distribution and execution is desired.

Therefore, a first threshold that defines an isolation level set in the TC manager 115 of the main host and a second threshold that defines a distribution level may be managed for each test case, and the job manager 114 may determine the sub host and perform scheduling based on the isolation level and distribution level of the test case allocated for each sub host.

Next, the testing device 100 may execute specific software or a specific test case in the constructed execution environment (S300).

Then, the testing device 100 may monitor a test case execution result of the sub host 120 (S400).

As described above, the log manager 118 may collect the log generated from device testing and the request or feedback from the user 10, and may store the log data for problem diagnosis or performance monitoring.

Furthermore, in the present exemplary embodiment, the system may additionally configure an NPU or GPU driver 106 on the Docker for machine learning-based testing.

Specifically, the system may install a GPU driver for a GPU of the testing device 100 connected to or mounted on the sub host so that the container may use a GPU resource of the main host, and allocate the GPU to the container. Further, driver libraries and utilities may be mounted on the container, so that the driver libraries and utilities may be used within the container.

At this time, the ML Perf 119 may analyze the performance data to find the optimization point or adjust the hyperparameters. In addition, the ML Perf 119 may generate and provide the report by summarizing the AutoML-based automated test results.

Further, the TC manager 115 may manage the list and properties of test cases to be used for testing, and track and analyze the execution results of the respective test cases in units of tests. In addition, the TC manager 115 tracks the change history of the test case and manage the change history by version.

As described above, the main host 110 may allow the pre-constructed execution environment to be reused according to the history of the setting information.

Specifically, snapshot may be used to reuse a virtual machine.

A specific state of the virtual machine may be stored as a snapshot and may be restored and used when necessary. The snapshot enables easy comparison between states before and after the test, and enables restoration in the event of an error.

Alternatively, a virtual machine with specific settings and software installed is stored as a template, and in a case where multiple virtual machines with the same settings are needed, the virtual machines may be quickly generated by using the template.

Furthermore, it is also possible to generate an identical environment by cloning a virtual machine that is being executed. That is, a new environment may be generated while maintaining the current state, which enables usage under dynamic test conditions.

On the other hand, as a way to reuse the Docker, the state of the Docker container may be stored as an image and a new container may be executed using the image.

The use of the image enables rapid environment configuration and distribution, and usability may be improved by uploading the image to a registry so that multiple people may easily access the image.

Alternatively, a script for generating a Docker image may be created in a Docker file, and an identical environment may be regenerated using the script. Unlike the case of using the image, the environment is configured using codes, and thus, environment settings are clear and version management is easy.

In addition, data may be stored outside the container, the same data may be reused in multiple containers, data persistence may be maintained, and data may be easily shared across multiple containers.

At this time, the isolation level and distribution level of the reused virtual machine or Docker container may be updated through the log manager 118, and the virtual environment may be determined when reused.

In addition, the main host 110 may authenticate the user 10, and in a step of receiving the setting information for the execution environment, setting information corresponding to an access right of the authenticated user 10 may be received.

Figure 9:
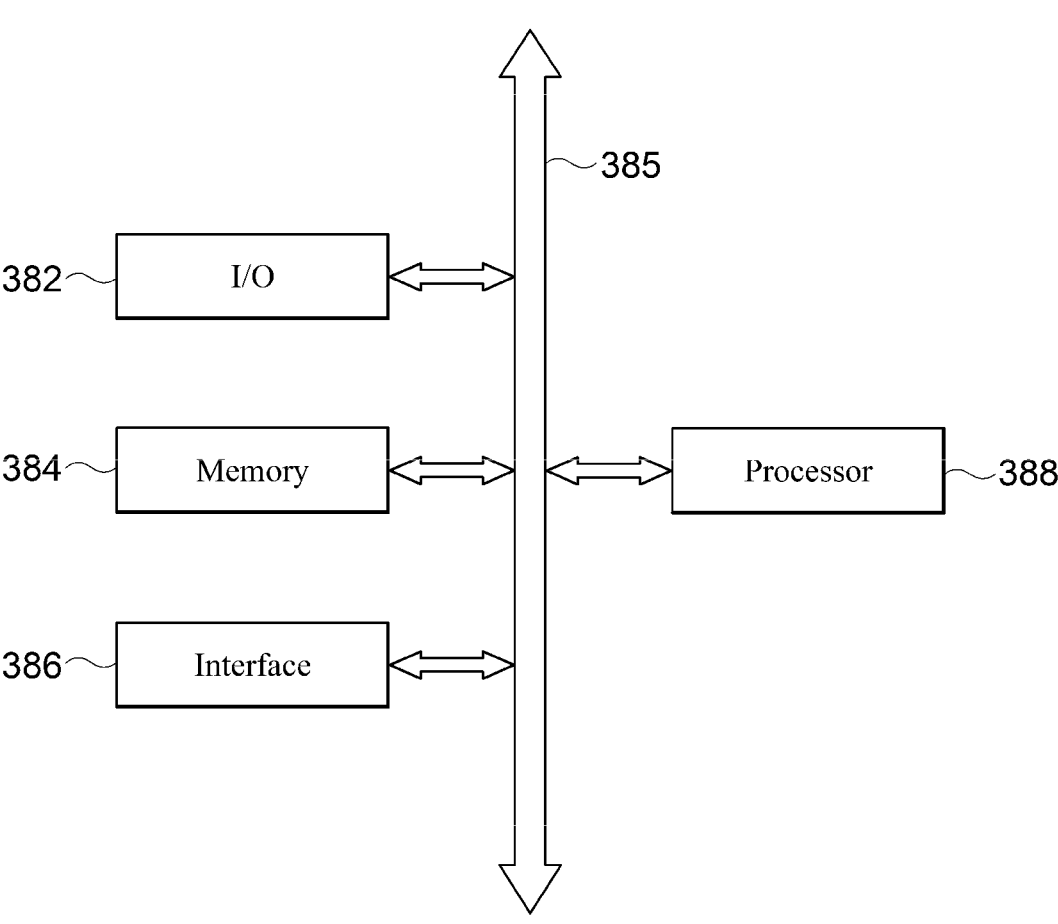
FIG. 9 is a diagram illustrating a hardware implementation of the computing device for testing according to an exemplary embodiment of the present invention.

Referring to FIG. 9, in some exemplary embodiments of the present invention, the service server 300 may be implemented in the form of a computing device. One or more of modules included in the service server 300 are implemented on a general-purpose computing processor and thus may include a processor 388, an input/output (I/O) device 382, a memory 384, an interface 386, and a bus 385. The processor 388, the input/output device 382, the memory 384, and/or the interface 386 may be coupled to each other through the bus 385. The bus 385 corresponds to a path through which data are migrated.

Specifically, the processor 388 may include at least one of a central processing unit (CPU), a micro processor unit (MPU), a micro controller unit (MCU), a graphic processing unit (GPU), a microprocessor, a digital signal processor, a microcontroller, and an application processor (AP), or a logic element capable of executing similar functions thereof.

The I/O device 382 may include at least one of a keypad, a keyboard, a touch screen, or a display device. The memory device 384 may store data and/or programs.

The interface 386 may execute a function of transmitting data to or receiving data from a communication network. The interface 386 may be a wired interface or a wireless interface. For example, the interface 386 may include an antenna or a wired or wireless transceiver. The memory 384 may be a volatile operation memory for improving operation of the processor 388 and protecting personal information, and may further include a high-speed dynamic random-access memory (DRAM) and/or static random access memory (SRAM).

Further, the memory 384 stores programming and data configurations that provide the functions of some or all of the modules described herein. For example, a logic for performing selected aspects of the training method described above may be included.

A program or application is loaded with a set of commands including each operation of performing the above-described training method stored in the memory 384, and the processor may perform each operation.

Various exemplary embodiments described herein may be implemented in a computer-readable recording medium or a recording medium readable by a device similar to a computer by using, for example, software, hardware, or a combination thereof.

According to a hardware implementation, the exemplary embodiments described herein may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions. In some cases, the exemplary embodiments described in the present specification may be implemented as a control module itself.

According to a software implementation, exemplary embodiments such as procedures and functions described in the present specification may be implemented as separate software modules. Each of the software modules may perform one or more functions and operations described in the present specification. A software code may be implemented as a software application written in a suitable programming language. The software code may be stored in a memory module and executed by a control module.

According to the present invention, resources may be utilized efficiently because there is no need to newly configure and prepare physical hardware resources every time during the development and testing of the embedded device.

According to the present invention, it is possible to greatly reduce initial and maintenance costs by eliminating the need to purchase actual hardware every time.

According to the present invention, various preset virtualization environments are used, and it is thus possible to easily handle various test cases and conditions.

According to the present invention, it is possible to shorten a time to physically prepare hardware and to quickly replicate or scale a required environment.

According to the present invention, it is possible to easily replicate the same testing environment, and thus, the accuracy and reliability in testing may be improved.

According to the present invention, automation and standardization may be easily achieved, as a result of which human errors may be reduced and consistency of test results may be maintained.

According to the present invention, the centralized main host may centrally manage all virtualized execution environments, and thus, it is possible to greatly reduce complexity and make management easier.

According to the present invention, the main host may manage a desired device, environment, TC, and the like for each user, which allows multiple developers or teams to work efficiently at the same time.

The technical spirit of the present invention has been described only by way of example hereinabove, and the present invention may be variously modified, altered, and substituted by those skilled in the art to which the present invention pertains without departing from essential features of the present invention.

Accordingly, the exemplary embodiments disclosed in the present invention and the accompanying drawings are provided in order to describe the technical spirit of the present invention rather than limit the technical spirit of the present invention, and the scope of the present invention is not limited by these exemplary embodiments and the accompanying drawings. The scope of the present invention should be interpreted by the following claims and it should be interpreted that all technical spirits equivalent to the following claims fall within the scope of the present invention.

What is claimed is:
1. An embedded device testing method having a hierarchical host structure, the embedded device testing method comprising:
    receiving, by a main host, setting information for an execution environment of a target device;
    determining, by the main host, a schedule of a test request of a user;

allocating a sub host when the target device and the execution environment become available according to the determined schedule;

constructing a virtualized execution environment on a sub host according to the setting information;

executing specific software or a specific test case in the constructed execution environment; and monitoring a result of the execution via a log manager, wherein the allocating of the sub host comprises determining a type of the virtualized execution environment based on a first threshold defining an isolation level and a second threshold defining a distribution level, which are set for the test case, and wherein the method further comprises:

updating the isolation level and the distribution level of the virtualized execution environment through the log manager to be applied when the virtualized execution environment is reused; and performing the reuse of the virtualized execution environment by at least one of: (i) utilizing an image uploaded to a registry for multi-user access, (ii) utilizing a script code defining environment settings for version management, or (iii) storing data external to a container for data persistence.

2. The embedded device testing method of claim 1, further comprising storing the constructed execution environment, wherein in the constructing of the virtualized execution environment on the sub host, a pre-constructed execution environment is reused according to a history of the setting information.

3. The embedded device testing method of claim 1, wherein in the constructing of the virtualized execution environment on the sub host, the execution environment is constructed on the allocated sub host.

4. The embedded device testing method of claim 1, further comprising storing, by the main host, the test case and a revision history of the test case.

5. The embedded device testing method of claim 1, further comprising authenticating, by the main host, the user, wherein in the receiving of the setting information for the execution environment, the setting information corresponding to an access right of the user is received.

6. A computing device comprising:

a processor; and a memory communicating with the processor, wherein the memory stores commands for causing the processor to perform operations, and the operations include;

an operation of receiving, by a main host, setting information for an execution environment of a target device, an operation of determining, by the main host, a schedule of a test request of a user, an operation of allocating a sub host when the target device and the execution environment become available according to the determined schedule, an operation of constructing a virtualized execution environment on a sub host according to the setting information, an operation of executing specific software or a specific test case in the constructed execution environment, and an operation of monitoring a result of the execution via a log manager, wherein the operation of allocating of the sub host comprises determining a type of the virtualized execution environment based on a first threshold defining an isolation level and a second threshold defining a distribution level, which are set for the test case, and wherein the operation further comprises:

updating the isolation level and the distribution level of the virtualized execution environment through the log manager to be applied when the virtualized execution environment is reused; and performing the reuse of the virtualized execution environment by at least one of: (i) utilizing an image uploaded to a registry for multi-user access, (ii) utilizing a script code defining environment settings for version management, or (iii) storing data external to a container for data persistence.

7. The computing device of claim 6, wherein the operations further include an operation of storing the constructed execution environment, and in the operation of constructing the virtualized execution environment on the sub host, a pre-constructed execution environment is reused according to a history of the setting information.

8. The computing device of claim 6, wherein in the operation of constructing the virtualized execution environment on the sub host, the execution environment is constructed on the allocated sub host.

9. The computing device of claim 6, wherein the operations further include an operation of storing, by the main host, the test case and a revision history of the test case.

10. The computing device of claim 6, wherein the operations further include an operation of authenticating, by the main host, the user, and in the operation of receiving the setting information for the execution environment, the setting information corresponding to an access right of the user is received.

* * * * *